M. H. EAST.
CAVINGS THRESHER FOR REAPER THRESHERS.
APPLICATION FILED JUNE 19, 1914.
1,118,191.   Patented Nov. 24, 1914.
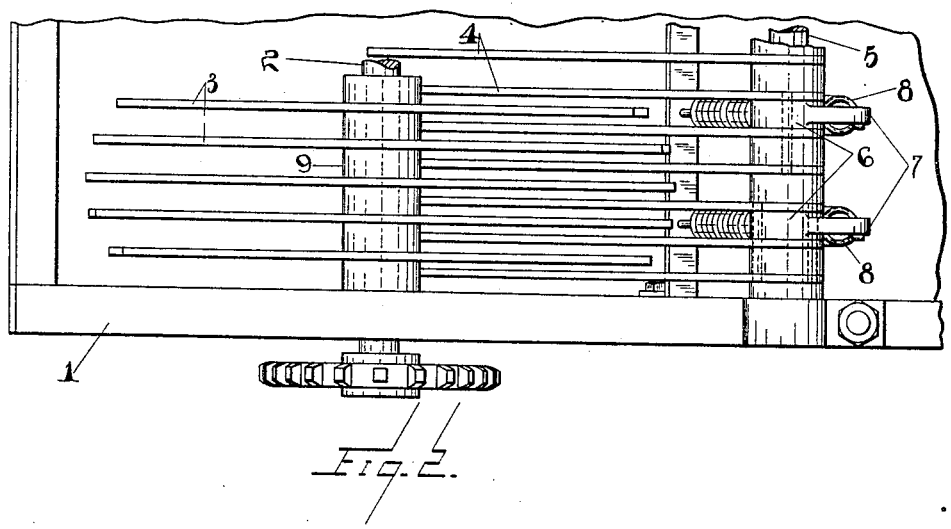
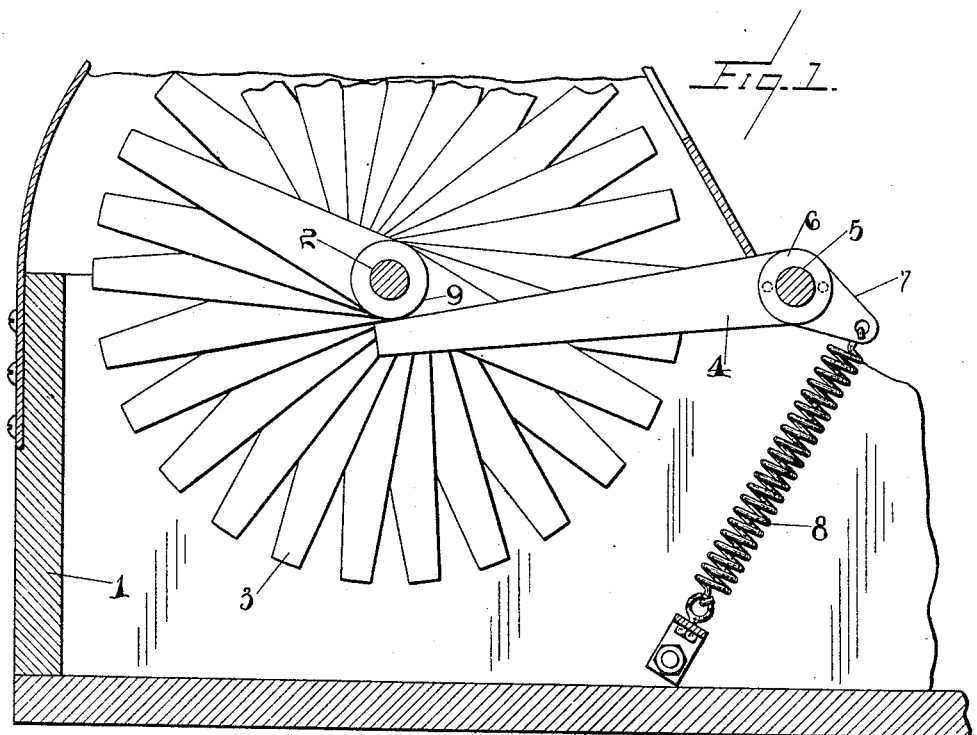
WITNESSES.
N. R. Tyndall.
E. P. Hall.
INVENTOR.
M. H. East.
BY J. Edward Maybee
ATTY

UNITED STATES PATENT OFFICE.

MATTHEW HENRY EAST, OF TORONTO, ONTARIO, CANADA, ASSIGNOR TO MASSEY-HARRIS COMPANY, LIMITED, OF TORONTO, CANADA.

CAVINGS-THRESHER FOR REAPER-THRESHERS.

1,118,191. Specification of Letters Patent. Patented Nov. 24, 1914.

Application filed June 19, 1914. Serial No. 846,109.

*To all whom it may concern:*

Be it known that I, MATTHEW H. EAST, a subject of the King of Great Britain, residing at the city of Toronto, in the county of York, Province of Ontario, Canada, have invented certain new and useful Improvements in Cavings-Threshers for Reaper-Threshers, of which the following is a specification.

This invention relates to the device used for threshing the cavings or unthreshed heads which have passed through the main threshing mechanism, and my object is to devise means for preventing foreign bodies such as stones or nuts from bolts damaging or choking up the apparatus. Such cavings threshers usually comprise a threshing cylinder formed of bars or teeth connected to a rotary shaft and coöperating with a concave formed of substantially straight inclined bars forming a fixed grating. In my improved device I journal the said bars preferably in groups, so that any group may swing independent of the others and hold said bars in their normal working position by means of springs of sufficient strength to hold the bars in working position under normal conditions, but which are adapted to yield to allow an unyielding foreign body to pass and drop through below the concave.

The invention is illustrated in the accompanying drawings in which—

Figure 1 is a vertical section of my improved cavings thresher, and Fig. 2 a plan view of the same.

In the drawings like numerals of reference indicate corresponding parts in the different figures.

1 represents the frame work of the thresher on which is journaled the cylinder shaft 2 driven in any suitable manner. The cylinder 3 is formed as usual of a plurality of spirally arranged radial teeth or bars. This cylinder coöperates with a concave formed of a series of bars 4. These bars are usually fixed in position so that a stone or metal nut or any other foreign body of any size which gets into the cavings will choke up the threshing apparatus and stop the operation of the machine until the obstruction is removed by hand. In order to prevent this trouble I pivot the bars 4 on a spindle 5, and provide means tending to hold said bars in their normal working position. I prefer to arrange the apparatus so that one or more only of the bars will be depressed from their normal working position by an obstruction, the remaining bars remaining in their normal working position, thus preventing a rush of unthreshed heads through the device. Preferably the bars are arranged in groups of two or three, as shown particularly in Fig. 2, the bars of each group being connected with a sleeve 6 journaled on the spindle 5. Each sleeve is provided with an arm 7 to which is connected one end of a coil spring 8, the other end of which is connected with a suitable stationary part of the frame. Each group is thus held in its normal working position independent of the others. The bars when in working position contact with the hub 9 of the cylinder, which hub forms a stop limiting the movement of the bars 4 under the action of the springs 8.

It will be understood, of course, that various modifications could be made which would fall within the scope of my invention, the main feature of which is the application of means for yieldingly holding the bars of the concave, preferably in groups, in their normal working position.

What I claim as my invention is:—

1. A cavings thresher comprising a cylinder formed of teeth connected to a hub; a concave formed of a series of bars pivoted at their ends; and spring means normally holding said bars in their working position with their ends firmly pressed against the aforesaid hub.

2. A cavings thresher comprising a cylinder formed of teeth connected to a hub; a concave formed of a series of groups of bars pivoted at their ends; and a separate spring for each group suitably connected and normally holding the bars of said group in their working position with their ends firmly pressed against the aforesaid hub.

3. A cavings thresher comprising a cylinder formed of teeth connected to a hub; a concave formed of a series of bars pivoted at their ends; and spring means normally holding said bars in their working position with their ends firmly pressed against the aforesaid hub, the bars and springs being arranged to permit of a localized yielding of the concave to permit of the passage of an unyielding foreign body.

Signed at Toronto, Ont. this sixth day of June 1914, in the presence of the two undersigned witnesses.

MATTHEW HENRY EAST.

Witnesses:
JAMES BYARD WARNOCK,
BAMBER MILTON KANNIGAN.

Copies of this patent may be obtained for five cents each, by addressing the "Commissioner of Patents, Washington, D. C."